(12) United States Patent
Woo et al.

(10) Patent No.: US 9,314,903 B2
(45) Date of Patent: Apr. 19, 2016

(54) ABRASIVE ARTICLE

(71) Applicant: 3M INNOVATIVE PROPERTIES COMPANY, St. Paul, MN (US)

(72) Inventors: Edward J. Woo, Woodbury, MN (US); Juan A. Munoz, Blaine, MN (US); Nataliya V. Fedorova, Woodbury, MN (US); Mark W. Orlando, Chesterfield Township, MI (US); Charles J. Studiner, IV, Cottage Grove, MN (US); Nicholas B. Manor, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 14/409,763

(22) PCT Filed: May 30, 2013

(86) PCT No.: PCT/US2013/043209
§ 371 (c)(1),
(2) Date: Dec. 19, 2014

(87) PCT Pub. No.: WO2014/003953
PCT Pub. Date: Jan. 3, 2014

(65) Prior Publication Data
US 2015/0190902 A1    Jul. 9, 2015

Related U.S. Application Data

(60) Provisional application No. 61/665,004, filed on Jun. 27, 2012.

(51) Int. Cl.
*B24D 3/20* (2006.01)
*B24D 3/28* (2006.01)
(Continued)

(52) U.S. Cl.
CPC .. *B24D 3/28* (2013.01); *B24D 3/20* (2013.01); *B24D 11/02* (2013.01); *C09K 3/1436* (2013.01)

(58) Field of Classification Search
CPC ............ B24D 3/28; B24D 3/20; B24D 11/02; C09K 3/1436
USPC .................................. 451/344–359, 531–539
See application file for complete search history.

(56) References Cited

U.S. PATENT DOCUMENTS

| | | | |
|---|---|---|---|
| 688,497 | A | 12/1901 | Weimar |
| 2,871,218 | A | 1/1959 | Schollenberger |

(Continued)

FOREIGN PATENT DOCUMENTS

| | | | | |
|---|---|---|---|---|
| DE | 3201825 | A1 * | 7/1983 | ............... B24D 7/02 |
| JP | 57-008082 | | 1/1982 | |

(Continued)

OTHER PUBLICATIONS

International Search report for PCT International Application No. PCT/US2013/043209 mailed on Sep. 2, 2013, 3 pages.

*Primary Examiner* — George Nguyen
(74) *Attorney, Agent, or Firm* — Scott A. Baum; David B. Patchett

(57) ABSTRACT

An abrasive article useful for finishing painted or clear coated surfaces is disclosed. The abrasive article included a structured abrasive layer disposed on a backing that is adhesively attached to nonwoven layer useful for providing conformability and attachment to a hook layer. The structured abrasive layer includes a central aperture and a plurality of surrounding apertures.

10 Claims, 1 Drawing Sheet

(51) Int. Cl.
 *B24D 11/02* (2006.01)
 *C09K 3/14* (2006.01)

(56) References Cited

U.S. PATENT DOCUMENTS

| | | | |
|---|---|---|---|
| 2,958,593 A | 11/1960 | Hoover | |
| 3,645,835 A | 2/1972 | Hodgson | |
| 4,595,001 A | 6/1986 | Potter | |
| 4,893,439 A * | 1/1990 | McAvoy | B24D 11/001 15/230 |
| RE33,353 E | 9/1990 | Heinecke | |
| 5,088,483 A | 2/1992 | Heinecke | |
| 5,142,829 A | 9/1992 | Germain | |
| 5,152,917 A | 10/1992 | Pieper | |
| 5,282,900 A * | 2/1994 | McDonell | A47L 13/17 134/2 |
| 5,286,782 A | 2/1994 | Lamb | |
| 5,354,797 A | 10/1994 | Anderson | |
| 5,435,816 A | 7/1995 | Spurgeon | |
| 5,454,844 A | 10/1995 | Hibbard | |
| 5,489,235 A * | 2/1996 | Gagliardi | B24D 11/00 451/527 |
| 5,591,239 A | 1/1997 | Larson | |
| 5,672,097 A | 9/1997 | Hoopman | |
| 5,681,217 A | 10/1997 | Hoopman | |
| 5,733,178 A * | 3/1998 | Ohishi | B24D 11/00 451/41 |
| 5,807,161 A * | 9/1998 | Manor | B24B 23/00 451/442 |
| 5,851,247 A | 12/1998 | Stoetzel | |
| 5,928,070 A * | 7/1999 | Lux | B24D 3/00 451/526 |
| 5,958,794 A * | 9/1999 | Bruxvoort | B24B 7/228 216/88 |
| 6,017,831 A | 1/2000 | Beardsley | |
| 6,139,594 A | 10/2000 | Kincaid | |
| 6,312,484 B1 | 11/2001 | Chou | |
| 6,352,567 B1 * | 3/2002 | Windisch | B24D 3/004 51/294 |
| 6,428,898 B1 | 8/2002 | Barsotti | |
| 6,544,593 B1 | 4/2003 | Nagata | |
| 6,838,589 B2 | 1/2005 | Liedtke | |
| 7,344,575 B2 * | 3/2008 | Thurber | B24D 3/28 451/28 |
| 8,080,073 B2 | 12/2011 | David | |
| 2002/0187737 A1 * | 12/2002 | Stuckenholz | B24D 13/16 451/533 |
| 2003/0032368 A1 | 2/2003 | Hara | |
| 2003/0114078 A1 * | 6/2003 | Mann | B08B 1/04 451/28 |
| 2006/0041065 A1 | 2/2006 | Barber, Jr. | |
| 2008/0081546 A1 * | 4/2008 | Takinami | B24D 11/00 451/527 |
| 2009/0017727 A1 | 1/2009 | Pribyl | |
| 2009/0088054 A1 * | 4/2009 | Gilles | B24D 13/16 451/537 |
| 2010/0255254 A1 | 10/2010 | Culler | |
| 2011/0065362 A1 * | 3/2011 | Woo | B24D 3/344 451/28 |
| 2014/0099871 A1 * | 4/2014 | Moren | B24D 3/34 451/532 |

FOREIGN PATENT DOCUMENTS

| | | |
|---|---|---|
| JP | 08-090423 | 4/1996 |
| WO | 2012-012940 | 2/2012 |
| WO | 2013-003252 | 1/2013 |

* cited by examiner

ABRASIVE ARTICLE

CROSS REFERENCE TO RELATED APPLICATIONS

This application is a national stage filing under 35 U.S.C. 371 of PCT/US2013/043209, filed May 30, 2013, which claims priority to U.S. Provisional Patent Application No. 61/665,004, filed Jun. 27, 2012, the disclosures of which are incorporated by reference in their entirety herein.

BACKGROUND

Removing defects from clear coats or painted surfaces can become more difficult as the contour of the painted surface increases. Foam backed abrasive articles having more compliance to the painted surface are a possibility. However, these foam-backed abrasive articles can be expensive due to the cost of the foam and the use of foam does not always ensure the abrasive article will work for its intended application.

SUMMARY

The inventors have determined that an improved abrasive article, intended for use on clear coats and painted surfaces, can be obtained by replacing the foam layer with a specific construction of a nonwoven layer and including a center aperture and a plurality of surrounding apertures. The nonwoven layer is designed to ensure the necessary compliance when removing defects and has a sufficiently open structure to enable it to be used as the loop layer to attach the abrasive article to a backup pad with hooks. Thus, by balancing the compliance and loftiness of the nonwoven it can serve two functions—replacing the foam layer and replacing the loop layer in the foam-backed abrasive articles thereby saving costs. Also, by including both a central aperture and plurality surrounding apertures, the performance of the improved abrasive article can be significantly increased beyond that of the foam-backed prior abrasive article.

Hence in one aspect, the invention resides in an abrasive article comprising:
- a structured abrasive layer attached to a first major surface of a backing, the structured abrasive layer comprising a plurality of abrasive composites formed from abrasive particles in a cross-linked binder;
- a nonwoven layer attached to a second major surface of the backing by an adhesive;
  - the nonwoven layer comprising:
    - a larger diameter fiber greater than or equal to 12 denier and 51 wt. % or more of the fibers of the nonwoven layer, and
    - a smaller diameter fiber less than or equal to 9 denier and 49 wt. % or less of the fibers of the nonwoven layer;
- a central aperture and a plurality of surrounding apertures in the structured abrasive layer;
  - the central aperture having a largest dimension from 8 mm to 20 mm, and
  - the total open area of the central aperture and the plurality of surrounding apertures is greater than or equal to 140 $mm^2$.

BRIEF DESCRIPTION OF THE DRAWINGS

Repeated use of reference characters in the specification and drawings is intended to represent the same or analogous features or elements of the disclosure.

DEFINITIONS

As used herein, variations of the words "comprise", "have", and "include" are legally equivalent and open-ended. Therefore, additional non-recited elements, functions, steps or limitations may be present in addition to the recited elements, functions, steps, or limitations.

DETAILED DESCRIPTION

Figure 1:
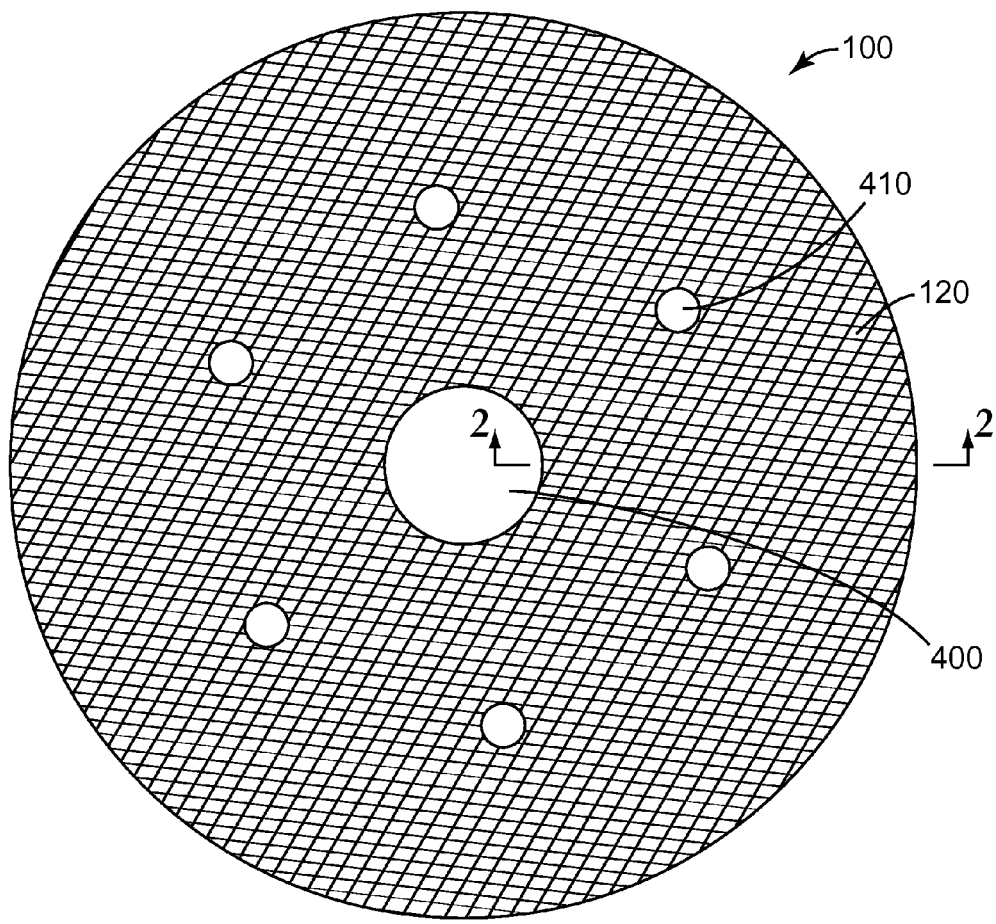
FIG. 1 is a top view of an abrasive article useful for removing defects in clear coats and painted surfaces
Figure 2:
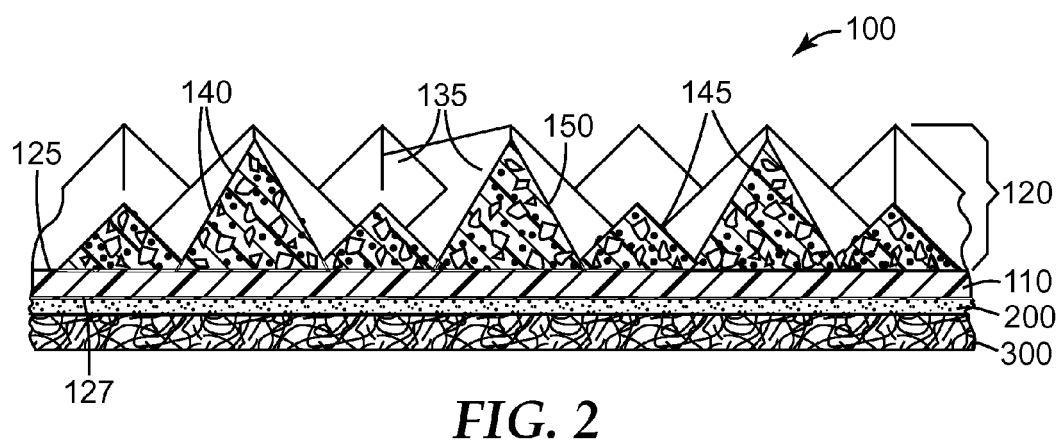
FIG. 2 is a partial cross section of the abrasive article of FIG. 1 taken at 2-2.

Referring to FIGS. 1 and 2, the abrasive article 100 includes a structured abrasive layer 120 disposed on and secured to a first major surface 125 of backing 110. The abrasive article further includes an adhesive layer 200 to secure a second major surface 127 of the backing to a nonwoven layer 300. Also present is a central aperture 400 and a plurality of surrounding apertures 410. FIG. 2 is not necessarily to scale since the height of the abrasive composites can be much smaller than the thickness of the nonwoven layer.

The structured abrasive article can be any shape, for example, round (e.g., a disc), oval, or rectangular (e.g., a sheet) depending on the particular shape of a support pad that may be used in conjunction with it. The structured abrasive article may have scalloped edges. Each component is discussed in more detail in the following sections.

Structured Abrasive Layer and Backing

Structured abrasive layer 120 comprises shaped abrasive composites 135. Each shaped abrasive composite 135 comprises abrasive grains 140, optional grinding aid particles 145, and optional surfactant (not shown) dispersed in a polymeric binder 150 as discussed in US 2011/0065362. In some embodiments, each shaped abrasive composite contains from 2.5 to 3.5 percent by weight of a nonionic polyether surfactant based on a total weight of the shaped abrasive composite.

As used herein, the term "shaped abrasive composite" refers to a body that comprises abrasive particles and a binder, and is intentionally formed in a non-random shape (e.g., a pyramid, ridge, etc.), and typically characterized by regular boundaries. Exemplary forming methods include cast and cure methods, embossing, and molding. The shaped abrasive composites may be disposed on the backing according to a predetermined pattern (e.g., as an array). In some embodiments, shaped abrasive composites are "precisely-shaped" abrasive composites. This means that the shape of the precisely-shaped abrasive composites is defined by relatively smooth surfaced sides that are bounded and joined by well-defined edges having distinct edge lengths with distinct endpoints defined by the intersections of the various sides. This precision is frequently obtained by use of a production tooling having a plurality of mold cavities to form the precisely-shaped abrasive composites. The terms "bounded" and "boundary" refer to the exposed surfaces and edges of each composite that delimit and define the actual three-dimensional shape of each abrasive composite. These boundaries are readily visible and discernible when a cross-section of an abrasive article is viewed under a scanning electron microscope. These boundaries separate and distinguish one precisely-shaped abrasive composite from another even if the composites abut each other along a common border at their bases. By comparison, in an abrasive composite that does not have a precise shape, the boundaries and edges are not well defined (e.g., where the abrasive composite sags before completion of its curing).

Precisely-shaped or shaped abrasive composites may be of any three-dimensional shape that results in at least one of a raised feature or recess on the exposed surface of the abrasive layer. Useful shapes include, for example, cubic, prismatic, pyramidal (e.g., square pyramidal or hexagonal pyramidal), truncated pyramidal, conical, frustoconical. Combinations of differently shaped and/or sized abrasive composites may also be used. The abrasive layer of the structured abrasive may be continuous or discontinuous.

Further details concerning structured abrasive articles having precisely-shaped abrasive composites, and methods for their manufacture may be found, for example, in U.S. Pat. No. 5,152,917 (Pieper et al.); U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,454,844 (Hibbard et al.); U.S. Pat. No. 5,851,247 (Stoetzel et al.); U.S. Pat. No. 6,139,594 (Kincaid et al.); U.S. Pat. No. 8,080,073 (David); 2009/0017727 (Pribyl); 2010/0255254 Culler; and 2011/0065362 (Woo). In particular, US patent publication 2011/0065362 from paragraph [0014] to paragraph [0060] is specifically incorporated by reference.

Typically, the shaped abrasive composites are arranged on the backing according to a predetermined pattern or array, although this is not a requirement. The shaped abrasive composites may be arranged such that some of their work surfaces are recessed from the polishing surface of the abrasive layer.

For fine finishing applications, the density of shaped abrasive composites in the abrasive layer is typically in a range of from at least 1,000, 10,000, or even at least 20,000 abrasive composites per square inch (e.g., at least 150, 1,500, or even 7,800 abrasive composites per square centimeter) up to and including 50,000, 70,000, or even as many as 100,000 abrasive composites per square inch (up to and including 7,800, 11,000, or even as many as 15,000 abrasive composites per square centimeter), although greater or lesser densities of abrasive composites may also be used.

The individual shaped abrasive composites comprise abrasive grains dispersed in a polymeric binder. Any abrasive grain known in the abrasive art may be included in the abrasive composites. Examples of useful abrasive grains include aluminum oxide, fused aluminum oxide, heat-treated aluminum oxide, ceramic aluminum oxide, silicon carbide, green silicon carbide, alumina-zirconia, ceria, iron oxide, garnet, diamond, cubic boron nitride, and combinations thereof. For repair and finishing applications, useful abrasive grain sizes typically range from an average particle size of from at least 0.01, 1, 3 or even 5 micrometers up to and including 35, 100, 250, 500, or even as much as 1,500 micrometers, although particle sizes outside of this range may also be used. Silicon carbide abrasive particles having an abrasives industry specified nominal grade corresponding to sizes in a range of from 3 and 7 micrometers are typically preferred. Typically, the abrasive particles are included in the abrasive composites in an amount of from 50 to 70 percent by weight, based on a total weight of the shaped abrasive composites, although other amounts may also be used.

The shaped abrasive composites may optionally contain additional ingredients such as, for example, dispersants, fillers, pigments, grinding aids, photoinitiators, hardeners, curatives, stabilizers, antioxidants, and light stabilizers.

Useful backings include, for example, paper, fabric, or film backings. Suitable film backings include polymeric films and primed polymeric films, especially those used in the abrasive arts. Useful polymeric films include, for example, polyester films (e.g., an ethylene-acrylic acid copolymer primed polyethylene terephthalate), polyolefin films (e.g., polyethylene or polypropylene films), and elastic polyurethane films. The film backing may be a laminate of two polymeric films. Examples of elastomeric polyurethanes that may be used to form films include those available under the trade designation ESTANE from B.F. Goodrich and Co. of Cleveland, Ohio and those described in U.S. Pat. No. 2,871,218 (Schollenberger); U.S. Pat. No. 3,645,835 (Hodgson); U.S. Pat. No. 4,595,001 (Potter et al.); U.S. Pat. No. 5,088,483 (Heinecke); U.S. Pat. No. 6,838,589 (Liedtke et al.); and RE 33,353 (Heinecke). Pressure-sensitive adhesive-coated polyurethane elastomer films are commercially available from 3M Company under the trade designation TEGADERM. Useful polymeric films are generally from about 0.02 to about 0.5 millimeters in thickness, for example, from 0.02 millimeter to 0.1 millimeter in thickness; however, this is not a requirement.

Adhesive Layer

A suitable adhesive is used to join the backing 110 to the nonwoven layer 300. In general a water resistant adhesive is utilized such that the abrasive article can be used in wet finishing applications.

Suitable types of adhesives include, but are not limited to, polyolefins, polyesters, polyurethanes, polyamides, phenolic adhesives, urea-formaldehyde adhesives, epoxy adhesives, acrylate adhesives, and the like. Particular examples of such adhesives include latex acrylonitrile/butadiene/styrene (ABS) and latex based acrylic adhesives available under the trade designation "HYCAR" from Noveon, Inc., Cleveland, Ohio; two part epoxies such as "EPI-REZ WD 510" available from Resolution Performance Products, Houston, Tex., with "JEFFAMINE T403" available from Huntsman Performance Chemicals, Houston, Tex.; and 2 part reactive polyurethane adhesives such as "VERSALINK P-1000" available from Air Products and Chemical Corporation of Allentown, Pa. with "ISONATE 143L" available from Dow Chemical Company, "RIBBON FLOW" urethane elastomers available from Crompton Corp., Middlebury, Conn.; and polyamide hot melt adhesive sheets available under the trade name "BEMIS 4220" from Bemis Associates, Inc., Shirley, Mass.

Nonwoven Layer

The nonwoven web comprises an entangled web of fibers. The fibers may comprise continuous fiber, staple fiber, or a combinations thereof. For example, the nonwoven web may comprise staple fibers having a length of at least about 20 millimeters (mm), at least about 30 mm, or at least about 40 mm, and less than about 110 mm, less than about 85 mm, or less than about 65 mm, although shorter and longer fibers (e.g., continuous filaments) may also be useful.

In order to have the necessary compliance and to enable attachment to a hook layer two types of fiber diameters are mixed a larger diameter fiber and a smaller diameter fiber. The larger diameter fiber builds bulk, provides integrity and allows for the desirable compression and conformation of the nonwoven layer. However, it is not well suited for engaging with the hooks of a back-up pad. To provide for the desired hook engagement a smaller diameter fiber is used. Additionally, the weight percentages of the large and small diameter fiber are controlled.

In one embodiment, a larger diameter fiber greater than or equal to 12 denier (13.3 dtex) is used and at least 51 wt. % of the nonwoven layer is formed from the larger diameter fiber. In combination with the larger diameter fiber, a smaller diameter fiber of less than or equal to 9 denier (10 dtex) is used and 49 wt. % or less of the nonwoven layer is formed from the smaller diameter fiber. In another embodiment, a larger diameter fiber greater than or equal to 14 denier (15.6 dtex) is used and at least 65 wt. % of the nonwoven layer is formed from the larger diameter fiber. In combination with the larger diameter fiber, a smaller diameter fiber of less than or equal to 7 denier (7.8 dtex) is used and 35 wt. % or less of the nonwoven layer is formed from the smaller diameter fiber. In another embodiment, a larger diameter fiber greater than or equal to 15 denier (16.7 dtex) is used and at least 70 wt. % of the nonwoven layer is formed from the larger diameter fiber. In combination with the larger diameter fiber, a smaller diameter fiber of less than or equal to 4 denier (4.4 dtex) is used and 30 wt. % or less of the nonwoven layer is formed from the smaller diameter fiber.

To further provide the necessary compliance and conformation, a selected thickness nonwoven layer of a certain density is typically used. The thickness is greater than or equal to 1.5 mm and less than or equal to 4.4 mm. The thickness was tested under a load of 0.5 lbs (227 grams) using a platen diameter of 3.5 inches (8.9 cm). The weight of the nonwoven layer is greater than or equal to 19 grains/24 sq in. (80 gsm) and less than or equal to 71 grains/24 sq. in (300 gsm).

The nonwoven web may be made, for example, by conventional air laid, carded, stitch bonded, spun bonded, wet laid, and/or melt blown procedures. Air laid nonwoven webs may be prepared using equipment such as, for example, that available under the trade designation "RANDO WEBBER" commercially available from Rando Machine Company of Macedon, N.Y.

Suitable fibers for the nonwoven web include natural fibers, synthetic fibers, and mixtures of natural and/or synthetic fibers. Examples of synthetic fibers include those made from polyester (e.g., polyethylene terephthalate), nylon (e.g., hexamethylene adipamide, polycaprolactam), polypropylene, acrylonitrile (i.e., acrylic), rayon, cellulose acetate, polyvinylidene chloride-vinyl chloride copolymers, and vinyl chloride-acrylonitrile copolymers. Examples of suitable natural fibers include cotton, wool, jute, and hemp. The fiber may be of virgin material or of recycled or waste material, for example, reclaimed from garment cuttings, carpet manufacturing, fiber manufacturing, or textile processing. The fiber may be homogenous or a composite such as a bicomponent fiber (e.g., a co-spun sheath-core fiber). The fibers may be tensilized and crimped, but may also be continuous filaments such as those formed by an spun bond process. Combinations of fibers may also be used.

Further details concerning nonwovens suited for use in abrasive articles, abrasive wheels and methods for their manufacture may be found, for example, in U.S. Pat. No. 2,958,593 (Hoover et al.); U.S. Pat. No. 5,591,239 (Larson et al.); U.S. Pat. No. 6,017,831 (Beardsley et al.); and U.S. Pat. Appln. Publ. 2006/0041065 A1 (Barber, Jr.).

In some embodiments, the thickness of the nonwoven layer can be adjusted by use of a calendaring or pressing operation. The calendaring operation can be performed with heated or unheated rolls using appropriate nip loads (pressure) to generate the desired thickness without removing too much bulk or increasing the density of the nonwoven layer too much to provide the desired compliance.

Frequently, it is useful to apply a prebond resin to the nonwoven web; especially those that are made by a needle tack process. The prebond resin serves, for example, to help maintain the nonwoven web integrity during handling. Examples of prebond resins include phenolic resins, urethane resins, hide glue, acrylic resins, urea-formaldehyde resins, melamine-formaldehyde resins, epoxy resins, and combinations thereof. The amount of prebond resin used in this manner is typically adjusted toward the minimum amount consistent with bonding the fibers together at their points of crossing contact. If the nonwoven web includes thermally bondable fibers, thermal bonding of the nonwoven web may also be helpful to maintain web integrity during processing.

Those skilled in the production of nonwoven abrasive articles will appreciate that the selection, amount, method of application, and chemical composition of prebond resin used for a particular embodiment of the invention can depend on a variety of factors including the fiber weight in the nonwoven, fiber density, fiber type, and the contemplated end use and desired properties of the finished abrasive article. In general, the prebond resin can be applied to a nonwoven as a relatively light coating, for example in a coating weight range between about 10 and 600 grams per square meter (dry add-on weight), preferably at least about 10-30 g/m$^2$.

The prebond resin may be applied to the nonwoven in any known manner in order to bond fibers of a nonwoven to one another. A preferred method for the application of a prebond resin is by roll coating, e.g., by use of a conventional two roll coater. Still, other methods may also be useful. After coating, the prebond resin can be hardened to provide a prebond coated onto the nonwoven (i.e., a prebonded nonwoven). Hardening can occur by a selected method generally depending on the chemical identity of the prebond resin and its mechanism for hardening. Examples of conditions that can be used to cause hardening of the prebond resin include conditions known to cure, polymerize, crosslink, or otherwise harden or solidify a chemical composition, e.g., elevated temperature, ultraviolet or other radiation, cooling, etc.

Apertures

The abrasive article includes a central aperture and a plurality of surrounding apertures cut through at least the structured abrasive layer. Depending on the porosity of the backing and/or nonwoven layer it may be unnecessary to cut the aperture all the way through the each of the layers in the abrasive article. Typically, for ease of manufacturing, the apertures are cut by die cutting or lasers completely through all layers in the abrasive article. While the apertures can have any desired shape such as square, triangular, hexagonal, oval, circular, slotted, curvilinear, or combinations thereof; typically, the apertures will be circular.

Generally the central aperture will have a diameter or largest dimension from 8 mm to 20 mm, or 9 mm to 15 mm although other sizes can be useful. The plurality of surrounding apertures can be arranged in many different patterns. The number of surrounding apertures can vary along with their location and placement. Generally, they will be arranged as radial spokes, grid patterns, or circular patterns. The surrounding apertures generally have a diameter or largest dimension from 0.1 mm to 10 mm or 0.2 to 4 mm, and they number from 4 to 200 or 6 to 160. As the diameter of the surrounding apertures is increased, typically fewer of them are needed. Finally, in order to achieve best cut and life with the abrasive article, the total open area of all the apertures is generally greater than or equal to 140 mm$^2$, greater than or equal to 150 mm$^2$, or greater than or equal to 160 mm$^2$, or greater than or equal to 180 mm$^2$.

It is believed that the central aperture helps to distribute aqueous liquids from the nonwoven layer onto the work surface, accumulate swarf (grinding debris), and prevent the buildup of swarf at the disc's center where the relative motion between the disc's surface and work piece may be less. The surrounding apertures are also believed to distribute aqueous liquids, accumulate swarf, and prevent the buildup of swarf at the disc's surface. As will be shown later in the Examples, significantly better finishing performance of the abrasive article occurred when using both a central aperture and a plurality of surrounding aperture over each of their individual uses or a non-apertured abrasive article.

Methods of Using the Abrasive Article

The work piece may comprise any material and may have any form. Examples of suitable materials include ceramic, paint, thermoplastic or thermoset polymers, polymeric coatings, polycrystalline silicon, wood, marble, and combinations thereof. Examples of substrate forms include molded and/or shaped articles (e.g., optical lenses, automotive body panels, boat hulls, counters, and sinks), wafers, sheets, and blocks. Methods according to the present disclosure are particularly useful for repair and/or polishing of polymeric materials such as motor vehicle paints and clearcoats (e.g., automotive clearcoats), examples of which include: polyacrylic-polyol-polyisocyanate compositions (e.g., as described in U.S. Pat. No. 5,286,782 (Lamb, et al.); hydroxyl functional acrylic-polyol-polyisocyanate compositions (e.g., as described in U.S. Pat. No. 5,354,797 (Anderson, et al.); polyisocyanate-carbonate-melamine compositions (e.g., as described in U.S. Pat. No. 6,544,593 (Nagata et al.); high solids polysiloxane compositions (e.g., as described in U.S. Pat. No. 6,428,898 (Barsotti et al.)). One suitable clearcoat comprises nanosized silica particles dispersed in a crosslinked polymer. An example of this clearcoat is available as CERAMICLEAR from PPG Industries of Pittsburgh, Pa. Other suitable materials that may be repaired and/or polished according to the present disclosure include marine gel coats, polycarbonate lenses, countertops and sinks made from synthetic materials, for example, such as those marketed as DUPONT CORIAN by E.I. du Pont de Nemours and Company of Wilmington, Del.

In typical usage of abrasive articles according to the present disclosure, the abrasive layer is brought into frictional contact with a surface of a work piece and then at least one of the abrasive article or the work piece is moved relative to the other to abrade at least a portion of the work piece. In order to facilitate swarf (i.e., loose dust and debris generated during abrasion of the work piece) removal surface the process is carried out in the presence of an aqueous fluid. As used herein, the term "aqueous" means containing at least 30 percent water by weight). Typically, the liquid comprises at least 90 or even at least 95 percent by weight of water. For example, the liquid may comprise (or consist of) municipal tap water or well water.

If desired the aqueous fluid may contain additional components besides water such as, for example, water miscible organic solvents (e.g., alcohols such as ethanol, 2-ethoxy ethanol and including polyols such as propylene glycol and/or polyethers such as diglyme), surfactants, and grinding aids. In practice, the aqueous fluid may be applied to the surface of the workpiece, the abrasive layer, or both.

The structured abrasive article may be moved relative to the work piece by hand or by mechanical means such as, for example, an electric or air-driven motor using any method known in the abrasive art. The structured abrasive article may be removably fastened to a back up pad (e.g., as is common practice with discs).

Once abrading using the structured abrasive article is complete, the workpiece is typically rinsed (e.g., with water) to remove residue generated during the abrading process. After rinsing, the work piece may be further polished using a polishing compound, for example, in conjunction with a buffing pad. Such optional polishing compound typically contains fine abrasive particles (e.g., having an average particle size of less than 100 micrometers, less than 50 micrometers, or even less than 25 micrometers) in a liquid vehicle. Further details concerning polishing compounds and processes are described in, for example, U.S. Pat. Appl. Pub. No. 2003/0032368 (Hara).

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Materials

TABLE 1

| | |
|---|---|
| AS1 | 443SA foam-backed abrasive sheet Hook-it backing is laminated onto foam backing. |
| AS2 | 464LA A7 abrasive sheet |
| B1 | 4309-2 or FE06736: 75% 15 denier nylon 6 from EMS Chemie AG, +25% 6 denier nylon 6,6 from Invista SARL, Spartanburg, South Carolina |
| PSA | PSA adhesive - "6035PC Adhesive Transfer Tape" from 3M Company. Maplewood, MN. This adhesive is used to bond the AS2 to B1 |
| B2 | tricot loop Nylon fabric 54 gsm, is obtained from SITIP S.p.A. Industrie Tessili, Cene, Italy |
| B3 | foam- 0.153 g/cm$^3$ open cell polyester polyurethane foam from illbruck, Inc, Minneapolis, Minnesota. 2.82 mm thick |

Preparation of B1

An air-laid nonwoven web was prepared from a blend of 75 wt % 15 denier×40 mm length nylon 6 and 25 wt % 6 denier× 38.1 mm length nylon 66. The web was needle-tacked at line speed of 3 m/min and strokes speed of 290/min. The needle penetration was 10 mm and the web was calendered at 218 degrees C. under 80 Psi (552 kPa) pressure. The web was further roll-coated to a dry add-on of 14 g/sq. meter with a mix of 75 wt % PM acetate (Dow Chemical Company, Midland, Mich.), 19% Dairen BL 16 (Chemtura Corporation, Middlebury, Conn.), and 6 wt % 42.33 vol % solids K450 (amine curing agent from Royce Associates, East Rutherford N.J.). The coated web was heated in a forced-convection oven set at 160 degrees C. for 5 minutes to cure the coating. The resulting coated, cured nonwoven web was about 2.4 mm thick and weighed about 155 g/sq. meter.

Examples 1-7, Example 9, and Comparative Examples A Through E

Examples 1 through 7, Example 9, and Comparative Examples A through H demonstrate the effects of varying the backing, abrasive structure, presence of a center hole and diameter, and number of surrounding holes on the efficacy of abrasive articles.

Example 1

The abrasive article of Example 1 was prepared by adhering a 3.5 in.×3.5 in. (8.9 cm×8.9 cm) sheet of AS2 to a 3.5 in.×3.5 in. (8.9 cm×8.9 cm) of B1 with PSA with the help of a hand roller applying a load of about 5 pounds (2.3 kg). A radial array of 153 holes with a 0.18 millimeter diameter and a 14 millimeter diameter center hole were cut with a Coherent Pulsed $CO_2$ laser (Model E-400, 10.6 micrometer wavelength, spot size 240 micrometers, 350 mm/s scan rate, repetition rate 25 kHz, 15% duty cycle (6 microsecond pulse duration) for 120 watts energy, 4× pass). The 3 in. (7.6 cm)

circular disc was cut using the same laser equipment at 1000 mm/s with a repetition rate of 25 kHz, 10% duty cycle (4 microsecond pulse duration) for 48.8 watts, 6× pass.

Examples 2-7 and Example 9

The abrasive articles of Examples 2 through 7 and Example 9 were prepared as those of Example 1, with the exception that the array of holes were varied in number, size, and the presence or absence of a 14-mm center hole, as shown in Table 2.

Comparative Example A

The abrasive article of Comparative Example A was a 3-inch foam-backed disc with a hook-and-loop attachment system and without holes. The thickness was 2.82 mm and the weight was 419 gsm. This article is commercially available as "443SA" from 3M, Saint Paul, Minn.

Comparative Example B

The abrasive article of Comparative Example B was prepared identically to Example 1 with the exception that no center hole was provided.

Comparative Example C

The abrasive article of Comparative Example C was prepared identically to Example 1 with the exception that no radial array of surrounding holes was provided.

Comparative Example D

The abrasive article of Comparative Example D was prepared identically to Comparative Example B with the exception that the diameter of the small holes was increased to 0.26 mm.

Comparative Example E

The abrasive article of Comparative Example E was prepared identically to Comparative Example B with the exception that the diameter of the small holes was increased to 0.35 mm.

Polishing Test Procedure 18 in×24 in (46 cm×61 cm) automotive base coat/color coat/clear coat (DuPont RK8148) test panels (obtained from ACT Laboratories, Hillsdale, Mich.) were divided into four 9 in ×12 in (23 cm×30 cm) quadrants and each quadrant was abraded with one of the Example abrasive discs using a random orbital sander ("3M Elite Series 28494" 3-in, non-vacuum, 3/16-in orbit, obtained from 3M, Saint Paul, Minn.) fitted with a soft disc pad ("3M Clean Sanding 20428", 3-in× 3/4-in×1/4-20 EXT, obtained from 3M, Saint Paul, Minn.). The operating air pressure was maintained at 90 psi (345 KPa). After attaching the Example disc to the disc pad, both the disc and the selected quadrant of the test panel were wetted with deionized water. The sanding assembly was placed in contact with the selected test panel quadrant and activated. The sander was first moved to abrade the perimeter of the selected test quadrant; then traversed in a left-to-right, right-to-left pattern, indexing down to provide a 50% overlap of each prior pass; and finally in a top-to-bottom, bottom-to-top pattern, indexing right to provide a 50% overlap of each prior pass. For each quadrant, the total sanding time was about 1.5 minutes. The sanding residue was removed by wiping with a soft cloth. Each Example abrasive disc was inspected for loading.

Following sanding, the test areas of each panel were polished with a pneumatic buffer ("28333 Buffer"), fitted with a disc pad ("20350 Hookit™ Clean Sanding Low Profile Disc Pad", 3-in×1/2-in×1/4-20 EXT), buffing pad ("Finesse-It™ Buffing Pad 25135", 3¾ in Gray Foam), and extra-fine polish ("Finesse-It™ 06002 Polish, Extra Fine"), all available from 3M, Saint Paul, Minn. The buffer was supplied with compressed air (90 psi, 345 KPa) and the buffing pad was conditioned by applying a thin even coating of polish and then attached to the disc pad. Polish was applied to the test area to be buffed and distributed using the face of the mounted buffing pad. The buffer was placed in contact with the test area and activated. The perimeter and traversing pattern described in the previous sanding step was repeated until the scratches were refined. A new buffing pad was used for each test area. Residual polish was removed by wiping with a soft cloth. Each test area was inspected for "wild" scratches and leveling characteristics (reduction of "orange peel") in the test area of the panel.

TABLE 2

| Example | Backing | Backing bulk density, g/cc | Outer hole dia., mm | Outer hole number | Center hole 14 mm | Hole area, sq. mm | Cut rate | Cut life | Finish/polishing |
|---|---|---|---|---|---|---|---|---|---|
| Comparative Example A | foam | 0.153 | 0 | 0 | 0 | 0 | 1 | 1 | good |
| Comparative Example B | B1 | 0.66 | 0.18 | 153 | 0 | 4 | 3x | 2.5x | bad |
| Example 1 | B1 | 0.66 | 0.18 | 153 | 1 | 158 | 3x | 2.5x | fair |
| Comparative Example C | B1 | 0.66 | 0 | 0 | 1 | 154 | 3x | 2.5x | fair |
| Comparative Example D | B1 | 0.66 | 0.26 | 153 | 0 | 8 | 3x | 2.5x | bad |
| Example 2 | B1 | 0.66 | 0.26 | 153 | 1 | 162 | 3x | 2.5x | good |
| Example 3 | B1 | 0.66 | 0.35 | 153 | 1 | 169 | 3x | 2.5x | good |
| Comparative Example E | B1 | 0.66 | 0.35 | 153 | 0 | 15 | 3x | 2.5x | bad |
| Example 4 | B1 | 0.66 | 0.53 | 153 | 1 | 186 | 3x | 2.5x | good |
| Example 5 | B1 | 0.66 | 1.75 | 29 | 1 | 223 | 3x | 2.5x | good |
| Example 6 | B1 | 0.66 | 0.35 | 153 | 1 | 168 | 3x | 2.5x | good |
| Example 7 | B1 | 0.66 | 1.75 | 29 | 1 | 223 | 3x | 2x | good |
| Example 9 | B1 | 0.66 | 4.0 | 6 | 1 | 204 | 3x | 2.5x | good |

Reviewing the results of Table 2, it can be seen that the use of only a plurality of surrounding holes (Comparative B) or the use of only a center hole in (Comparative C) had 3× cut and 2.5× life but bad (unacceptable) finish or polishing on the test panel compared to the foam-backed abrasive article (Comparative A). However, inclusion of both a center hole and a plurality of surrounding holes solved the finish problems while providing 3× cut and 2.5× life in the Examples. Additionally as the open area of the apertures increased, the ability of the abrasive discs to provide a superior finish increased allowing the buffing process to provide a superior finish on the test panel. Finally, it is believed that the above described nonwoven layer contributed significantly to a performance increase of 3× cut and 2.5× life as compared to the prior foam backing. A tripling of the performance by switching the conformable layer from foam to the nonwoven was quite surprising and unexpected.

Example 8 and Comparative Examples F and G

Example 8 and Comparative Examples F and G demonstrate the contribution of center hole size on the efficacy of abrasive articles.

Example 8

The abrasive article of Example 8 was prepared identically to Example 5 with the exception that the center hole was 10 mm in diameter.

Comparative Example F

The abrasive article of Comparative Example F was prepared identically to Example 5 with the exception that no center hole was provided.

Comparative Example G

The abrasive article of Comparative Example G was prepared identically to Example 5 with the exception that the center hole was 5 mm in diameter.

Example 8 and Comparative Examples F and G were tested according to the Polishing test and compared to Example 5. The results are shown in Table 3. As seen in the Table, the a 5 mm diameter center hole did not provide the necessary finish, a 10 mm diameter center hole provided a fair finish, and a 14 mm diameter center hole provide a good finish.

TABLE 3

| Example | Backing | Outer hole mm | Outer hole number | Center hole 5 mm | Center hole 10 mm | Center hole 14 mm | Hole area, sq. mm | Cut rate | Cut life | Finish/ polishing |
|---|---|---|---|---|---|---|---|---|---|---|
| Comparative Example F | B1 | 1.75 | 29 | 0 | 0 | 0 | 70 | 2.5x | 2.5x | bad |
| Comparative Example G | B1 | 1.75 | 29 | 1 | 0 | 0 | 89 | 3x | 2.5x | bad |
| Example 8 | B1 | 1.75 | 29 | 0 | 1 | 0 | 148 | 3.0x | 2.5x | fair |
| Example 5 | B1 | 1.75 | 29 | 0 | 0 | 1 | 224 | 3x | 2.5x | good |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive article comprising:
    a structured abrasive layer attached to a first major surface of a backing, the structured abrasive layer comprising a plurality of abrasive composites formed from abrasive particles in a cross-linked binder;
    a nonwoven layer attached to a second major surface of the backing by an adhesive layer;
        the nonwoven layer comprising:
            a larger diameter fiber greater than or equal to 12 denier and 51 wt. % or more of the fibers of the nonwoven layer, and
            a smaller diameter fiber less than or equal to 9 denier and 49 wt. % or less of the fibers of the nonwoven layer;
    a central aperture and a plurality of surrounding apertures in the structured abrasive layer;
        the central aperture having a largest dimension from 8 mm to 20 mm, and
        the total open area of the central aperture and the plurality of surrounding apertures is greater than or equal to 140 mm$^2$.

2. The abrasive article of claim 1 wherein the abrasive particles are 30 micrometers or less in size and the number of the plurality of abrasive composites is greater than 150 per square cm.

3. The abrasive article of claim 1 wherein a thickness of the nonwoven layer is from 1.5 mm to 4.4 mm.

4. The abrasive article of claim 1 wherein a basis weight of the nonwoven layer is from 80 to 300 gsm.

5. The abrasive article of claim 1 wherein the largest dimension of the central aperture is from 9 mm to 15 mm.

6. The abrasive article of claim 1 wherein the plurality of surrounding apertures have a largest dimension from 0.2 mm to 4 mm and they number from 4 to 200.

7. The abrasive article of claim 1 wherein the total open area of the central aperture and the plurality of surrounding apertures is greater than or equal to 160 mm$^2$.

8. The abrasive article of claim 1 wherein the larger diameter fiber is greater than or equal to 15 denier and 70 wt. % or more of the fibers of the nonwoven layer, and the smaller diameter fiber is less than or equal to 4 denier and 30 wt. % or less of the fibers of the nonwoven layer.

9. The abrasive article of claim 1 wherein the nonwoven layer comprises a prebond resin.

10. A method of abrading a polymeric coating, such as a paint layer or a clear coat layer, the abrading method comprising: imparting relative motion between the abrasive article of claim 1 and the polymeric coating while performing the abrading in the presence of an aqueous fluid.

\* \* \* \* \*